United States Patent
Howland

(10) Patent No.: US 6,877,641 B2
(45) Date of Patent: Apr. 12, 2005

(54) LEVELING MOUNTING BRACKET

(75) Inventor: David Howland, Aptos, CA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 39 days.

(21) Appl. No.: 10/280,136

(22) Filed: Oct. 23, 2002

(65) Prior Publication Data

US 2004/0079857 A1 Apr. 29, 2004

(51) Int. Cl.$^7$ ................................................ B67D 5/06
(52) U.S. Cl. ............... 222/180; 222/181.3; 248/224.51; 248/220.22
(58) Field of Search ........................ 248/220.22, 223.41, 248/224.51, 682, 688, 295.11, 297.21, 297.31, 225.11; 222/180, 181.1, 181.2, 181.3, 153.01, 153.02, 153.03, 153.04; 33/354, 365, 370, 371; 403/321, 322.1, 322.3, 322.4, 326, 327

(56) References Cited

U.S. PATENT DOCUMENTS

| | | | |
|---|---|---|---|
| 262,661 A | * | 8/1882 | Gordon ...................... 211/101 |
| 1,252,207 A | | 1/1918 | Walker |
| 1,794,700 A | * | 3/1931 | McCaskey ............. 248/224.51 |
| 1,857,050 A | * | 5/1932 | Jones .................... 248/224.51 |
| 2,168,885 A | * | 8/1939 | Rickenbach et al. .......... 33/365 |
| 3,311,435 A | | 3/1967 | Heritage |
| 4,228,982 A | * | 10/1980 | Sellera ....................... 248/467 |
| 4,436,269 A | | 3/1984 | Dirksing et al. |
| 5,035,389 A | | 7/1991 | Wang |
| 5,356,038 A | | 10/1994 | Banks |
| 5,707,033 A | * | 1/1998 | Holt et al. ............. 248/225.11 |
| 5,709,057 A | * | 1/1998 | Johnson, Jr. et al. ......... 52/301 |
| 6,176,641 B1 | * | 1/2001 | Schenk ........................ 403/381 |
| 6,244,552 B1 | | 6/2001 | Adams et al. |
| 6,371,424 B1 | * | 4/2002 | Shaw ..................... 248/222.12 |

FOREIGN PATENT DOCUMENTS

| | | |
|---|---|---|
| DE | 8901019 U1 | 3/1989 |
| GB | 2345313 A | 7/2000 |

OTHER PUBLICATIONS

U.S. patent application No. US 2002/0109064 to Zuller, filed Feb. 12, 2001, published Aug. 15, 2002.*
U.S. patent application No. US 2002/0074356 to Lewis et al., filed Jul. 23, 2001, published Jun. 20, 2002.*
U.S. patent application No. US 2002/0066199 to Hanson, filed Dec. 2, 2000, published Jun. 6, 2002.*

* cited by examiner

Primary Examiner—Leslie A. Braun
Assistant Examiner—Jon Szumny
(74) Attorney, Agent, or Firm—Townsend & Townsend & Crew LLP

(57) ABSTRACT

A mounting method and a mounting apparatus to enable the level mounting of a first article to a second article. In accordance with one aspect of the present invention, an apparatus for mounting a first article to a second article to permit the level mounting of the first article comprises a bracket for fixed attachment to the second article, the bracket configured to receive the first article. The bracket has a level built into it, such that the bracket is installed such that the first article when mounted to said bracket is level.

26 Claims, 2 Drawing Sheets

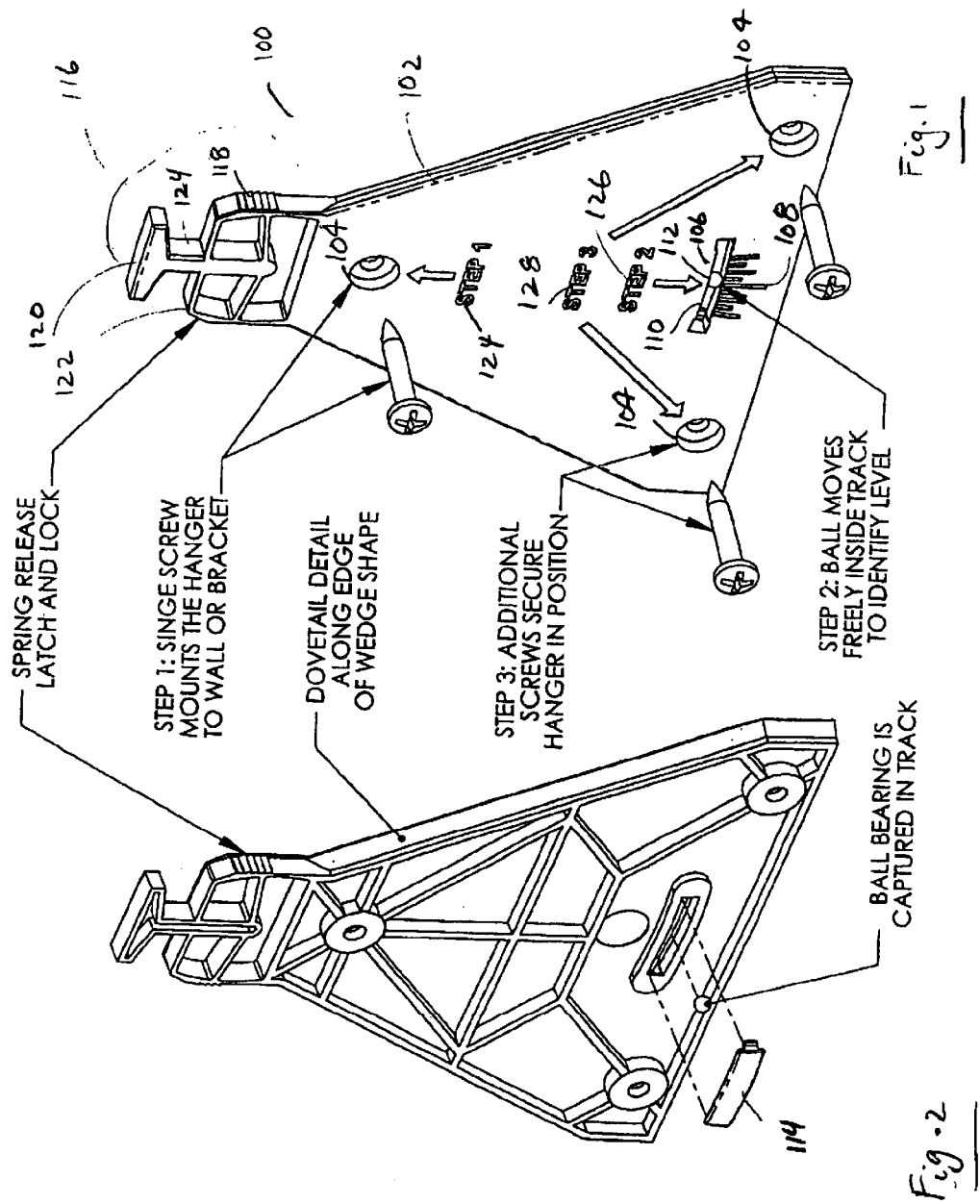

LEVELING MOUNTING BRACKET

BACKGROUND OF THE INVENTION

This invention is related to devices and methods for mounting a first article to a second article such that the first article when mounted is level.

Commonly a bracket is used to mount a first article to a second article. Regardless of using a bracket, traditionally a level is held up against the article or the bracket so that it may be mounted in a level position so as to enable the level mounting of a first article to a second article. The requirement of needing a separate level can be cumbersome in certain applications. Furthermore, certain articles or brackets, either due to their geometric shape or the shape of the article to which they are mounted, do not readily lend themselves to the use of a separate level; for example, when mounting an article to a wall where the article does not possess a flat external surface against which a level may be held.

BRIEF SUMMARY OF THE INVENTION

The present invention is directed to providing a mounting apparatus to enable the level mounting of a first article to a second article. In accordance with one aspect of the present invention, an apparatus for mounting a first article to a second article to permit the level mounting of the first article comprises a bracket for fixed attachment to the second article, the bracket being configured to receive the first article. The bracket has a level built into it, such that the bracket may be installed such that the first article when mounted to the bracket is level.

In certain embodiments, the mounting apparatus includes a mechanical lock and release mechanism to hold the first article securely in place after the article has been mounted to the mounting apparatus. Such a mechanical lock and release mechanism may be a plunger mechanism, such as a ball and spring plunger, or a spring plunger mechanism as well as a slide latch mechanism and a latch and lock mechanism.

In certain embodiments having a mechanical lock and release mechanism, the mounting apparatus includes a saw tooth structure configured to engage a matching saw tooth structure in the first article, so as to lock the first article with the bracket once the bracket has received the first article. In certain embodiments, the saw tooth-structured locking mechanism also includes a spring release mechanism having a handle. A pushing force on the handle disengages the saw tooth structure of the bracket's latching mechanism from the saw tooth structure of the first article.

In some embodiments, the bracket portion of the mounting apparatus includes an overlapping interlock mechanism, such as, for example a dovetail structure configured to engage a matching overlapping interlock structure in an article that is mounted to the mounting apparatus.

In accordance with another aspect of the invention, the bracket of the mounting apparatus is a male member having an overall shape configured to mate with a corresponding female member of an article that is mounted to the mounting apparatus.

In certain embodiments, the level that is built into the bracket portion of the mounting bracket includes a ball that moves freely along a track to identify level. The ball moves to a center position when the bracket is level. Some embodiments include a track cover that is configured to engage the track and thus help prevent the ball from falling out of the track.

In other embodiments, the level that is built into the bracket portion of the mounting apparatus includes an encased, liquid-filled tube having an air bubble that moves to a center window when the bracket is level.

In accordance with another aspect of the invention, a method for mounting a first article to a second article to permit the level mounting of the first article, comprises providing a bracket for fixed attachment to the second article, where the bracket is configured to receive the first article. The bracket has a level built into the bracket, such that the bracket may be installed such that the first article when mounted to the bracket is level. The method further includes attaching the bracket to the second article using a fastener through a mounting aperture in the bracket that is configured to receive a fastener. Thereafter, the method includes leveling the bracket using the level; attaching the bracket to the second article using a second fastener through a mounting aperture in the bracket that is configured to receive the second fastener and attaching the first article with said bracket.

For a further understanding of the nature and advantages of the present invention, reference should be made to the following description in conjunction with the accompanying drawings.

BRIEF DESCRIPTION OF THE DRAWINGS

FIG. 1 is front perspective view of an apparatus for mounting a first article to a second article according to an embodiment of the present invention.

FIG. 2 is a back perspective view of the mounting apparatus of FIG. 1.

DETAILED DESCRIPTION OF THE INVENTION

Figure 4:
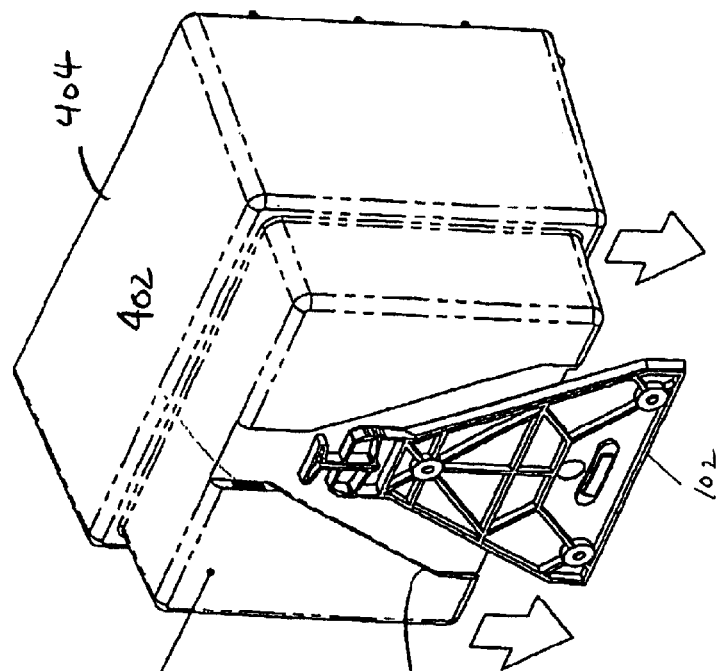
FIG. 4 is a perspective disassembled view of first article being attached with the mounting apparatus according to an embodiment of the present invention.

FIG. 1 shows a front perspective view of an apparatus 100 for mounting a first article to a second article according to an embodiment of the present invention. The mounting apparatus includes a bracket body 102 having a plurality of mounting apertures 104. The apertures 104 are configured to receive fasteners for mounting the apparatus 100 to a wall or another apparatus. The bracket body 102 also includes a built-in level 106. The bracket body 102 also includes various markings 108 near the level 106 to aid in the level mounting of the bracket to a wall or another object. In one embodiment, the level is made by having a curved track 110 formed in the bracket body in which a ball 112 freely moves. Optionally, the ball 112 is maintained in the track 110 by placing a track cover 114 (shown in FIG. 2) over the track 110. The ball 112 is made from a material that is chosen to be suitable for a particular application. In one case, when corrosion resistance is a concern, a stainless steel ball is preferred. Alternately, the level can be an encased, liquid-filled tube containing an air bubble that moves to a center position when the mounting bracket is level.

Additionally, the mounting apparatus 100 includes a spring-releasable latch and lock mechanism 116. The latch and lock mechanism 116 includes a saw tooth structure 118 that engages a corresponding structure 402 in an article 404 that is mounted on the mounting bracket, as is, for example, shown in FIG. 4. The latch and lock mechanism includes spring members 120 and 122 that enable a spring release of an article that has mated with the mounting apparatus 100. The pressing down on the handle 120 will push member 124 down and thus pull in the saw tooth structure of the mounting bracket body 102 to disengage the saw tooth structure from that on the article 404 which is mounted on the mounting apparatus.

Alternatively, instead of the spring-releasable latch and lock mechanism, other mechanical lock and release mechanisms may be used. These other mechanical lock and release mechanisms include a plunger mechanism, such as a ball and spring plunger, or a spring plunger mechanism as well as a slide latch mechanism and a latch and lock mechanism, and so on. When using a plunger or a latch, the plunger or the latch engages a matching detent in the article which is mounted to the mounting apparatus. As the locking and release operations of a plunger or a ball plunger are known, further details are not provided herein. For example, with a plunger, to move the plunger from an engaged detent, the detent or the mounting apparatus is moved with respect to the plunger or the detent to disengage the plunger from the detent and thus allow it to engage a next detent in a track.

FIG. 2 shows a back perspective view of the mounting apparatus of FIG. 1. This figure (FIG. 2) shows various ribbing members integrated with the mounting apparatus to provide an adequate level of structural rigidity for the mounting apparatus.

In one embodiment, the mounting apparatus 102 has a generally triangular shape. While the mounting apparatus may have any shape, this shape is preferred as it provides for a structurally sound shape for attachment of the mounting apparatus to another object and for the mounting of an article, such as for example, 404 to the mounting apparatus. A preferred aspect of the shape of the mounting apparatus is to have the mounting apparatus 100 match a recess in the article which is mounted using the apparatus. As is shown in FIG. 4, the mounting apparatus 100 and the recess 406 are of generally the same shape to enable the two to mate up against one-another and thus enable a structurally sound mounting arrangement.

Figure 3:
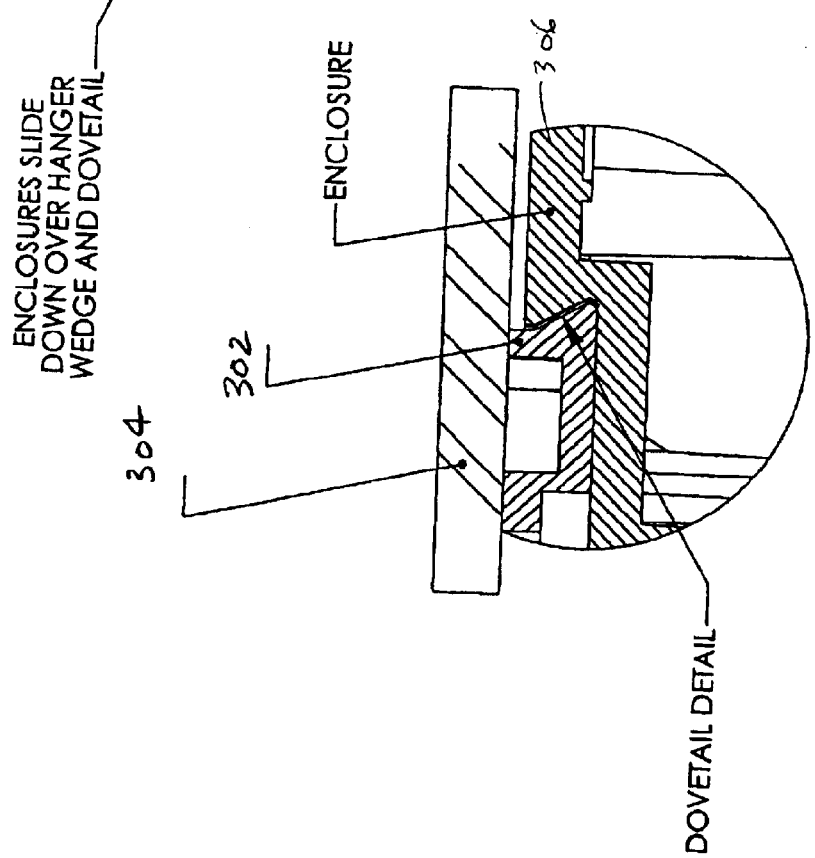
FIG. 3. is a detail figure showing the overlapping interlock detail of the engagement of the mounting apparatus with a first article.

In certain embodiments, in order to ensure a stable mounting, the mounting apparatus and the recess in the article which is mounted using the mounting apparatus include an overlapping interlock structure, such as for example, an interlocking wedge/dovetail arrangement, as is shown in FIG. 3. The detail shown in FIG. 3 is a cross-sectional view showing the mounting apparatus 302 having a wedge/dovetail shape mounted to a wall 304 (or another object). This figure also shows the article 404 having a recess 406 and a matching wedge/dovetail shape 306. This overlapping interlock (e.g., wedge/dovetail) arrangement ensures that once an article is mounted to the mounting apparatus it is prevented from being pulled away from the mounting apparatus and thus provide a structurally sound coupling between the mounting apparatus and the article that is mounted using the mounting apparatus.

The mounting apparatus may be manufactured using a variety of techniques known to those skilled in the art, however it is preferred to use a material that is suitable for the application. One application of the mounting apparatus is for the mounting of a ware wash chemical dispenser for an industrial laundry to another article, such as, for example, a wall. Due to moist or humid nature of such an environment, corrosion resistance is a factor and so is cost, and as such the mounting apparatus is manufactured using a plastic material. The use of a plastic material also helps keep the cost of the product reasonably low. However, other materials, including stainless steel, other steels, aluminum and other material including composite materials are also equally suitable for the manufacture of the mounting apparatus.

In operation, to mount an article 404, to a wall, for example, first the mounting apparatus 102 is fastened to a wall using a fastener fitted through a top mounting aperture. Next, the mounting apparatus is leveled using the level 106 by for example, swinging the mounting apparatus into a level position. Once the mounting apparatus is leveled, it is then further secured to the wall by using additional fasteners fitted through the additional mounting apertures near the bottom of the mounting apparatus. Next, the article 404 is fitted to the bracket, which in one embodiment is achieved by sliding the article 404 over the mounting apparatus 102. In this manner the article 404 is mounted in a level manner, since the mounting apparatus 102 was first leveled using the built-in level 106. Once in place the mounting apparatus's lock and release mechanism (e.g., saw tooth structures, plunger, latch, etc.) lock against those of the article 404 to lock the article in place. The locking mechanism is advantageous because once the article is mounted, it is securely held in place and will not move in the normal course of the usage of the article. Furthermore, the locking mechanism will securely hold the article in place in case the article is accidentally knocked into, or so on. Then, as is needed, the article may be unlocked from the mounting apparatus, and once unlocked the article 404 may be easily lifted up and removed from the mounting apparatus. In certain embodiments, the mounting apparatus includes markings 124, 126, 128 to aid an installer in the mounting of the apparatus. The markings are advantageous as they eliminate the need for a separate set of instructions.

One advantage of the mounting apparatus of the present invention is that it enables the level mounting of one article to another without requiring a separate level. Furthermore, for certain articles that have shapes that do not have any flat surfaces—to place a level on—the use of a separate level would still not be feasible for the level mounting of the article.

The above-described arrangement of apparatus and methods are merely illustrative of the applications of the principles of this invention and many other embodiments and modifications may be made without departing from the spirit and scope of the invention as defined by the claims. For example, the mounting apparatus may have different shapes. The mounting apparatus may be made of many different materials and may be manufactured using many different processes. The mounting apparatus may include a variety of different mechanical lock and release mechanisms.

What is claimed is:

1. An assembly for mounting a first article to a second article to permit the level mounting of the first article, comprising:

a bracket for fixed attachment to the second article, said bracket configured to receive the first article, said bracket having a triangular-shaped lower portion and having side edges extending along the outer edges of said triangular-shaped portion;

a level built into said bracket, to enable the secure and adjustable level mounting of said bracket to said second article, to enable the first article when mounted to said bracket to be level;

a first article for slidably engaging said bracket, said first article having a recess having a shape that is complimentary with the shape of said bracket, the recess having side edges that are complementarily-shaped to engage against said side edges of said bracket, such that once said first article slides into engagement against said bracket, the engaged edges of said bracket and said first article prevent the first article from being pulled away from said bracket; and a releasable locking mechanism integrally formed along an upper portion of said bracket, said mechanism having surfaces that are shaped to engage complementary surfaces near the top portion of said recess of said first article, such that once said first article slides into engagement against said bracket, the engaged surfaces of said bracket and said first article prevent the first article from being slidably movable relative to said bracket;

wherein said locking mechanism is urged in a downward direction toward said triangular-shaped lower portion to release said first article from said bracket.

2. The assembly of claim 1 further comprising means for attachment of said bracket to the second article.

3. The assembly of claim 2 wherein said means for attachment comprise at least one mounting aperture in said bracket that is configured to receive a fastener, the fastener configured to engage the second article, wherein said one aperture is located on said bracket in a manner to permit said bracket to pivot about the fastener when engaged to the second article.

4. The assembly of claim 1 wherein the second article is a wall.

5. The assembly of claim 1 wherein said locking mechanism is a ball plunger, a spring plunger, a slide latch or a releasable saw tooth mechanism.

6. The assembly of claim 1 wherein said locking mechanism comprises a saw tooth structure configured to engage a matching saw tooth structure in the first article, so as to lock the first article with said bracket once said bracket has received the first article.

7. The assembly of claim 6 wherein said locking mechanism further comprises a flexible mechanism having a handle, such that a pushing force on said handle disengages said saw tooth structure of said bracket's locking mechanism from the saw tooth structure of the first article.

8. The assembly of claim 1 wherein said edges of said bracket form an overlapping interlock structure with said side edges of said first article, when said first article slides into engagement against said bracket.

9. The assembly of claim 1 wherein said edges of said bracket form a dovetail structure configured to engage a matching dovetail structure in the first article, when said first article slides into engagement against said bracket.

10. The assembly of claim 1 wherein said bracket is a male member having an overall shape configured to mate with a corresponding female member of the first article.

11. The assembly of claim 1 wherein said bracket comprises a plastic material.

12. The assembly of claim 1 wherein said level comprises a ball that move freely along a curved track to identify level and that said ball moves to a center position when said bracket is level.

13. The assembly of claim 12 further comprising a track cover configured to engage said track and to maintain said ball in said track.

14. The assembly of claim 1 wherein said level comprises a curved encased, liquid-filled tube having an air bubble that moves to a center window when said bracket is level.

15. The assembly of claim 1 wherein the first article comprises a ware wash chemical dispenser.

16. The assembly of claim 1 wherein the first article comprises a chemical dispenser.

17. The assembly of claim 16 wherein said chemical dispenser is a chemical dispenser for an industrial laundry or ware wash chemical dispenser.

18. A method for mounting a first article to a second article to permit the level mounting of the first article, comprising:

providing a bracket for fixed attachment to the second article, said bracket configured to receive the first article, said bracket having a level built into said bracket, such that said bracket is installed such that the first article when mounted to said bracket is level;

attaching said bracket to the second article using a fastener through a mounting aperture in said bracket that is configured to receive a fastener, wherein the aperture is located on said bracket in a manner to permit said bracket to pivot about the fastener when engaged to the second article;

leveling said bracket using said level, by pivoting said bracket about the fastener;

attaching said bracket to the second article using a second fastener through a mounting aperture in said bracket that is configured to receive the second fastener; and attaching the first article with said bracket, said bracket having triangular-shaped edges on a lower portion thereof for engaging complimentary triangular-shaped in said first article, such that once said first article slides into engagement against said bracket, the engaged edges of said bracket and said first article prevent the first article from being pulled away from said bracket;

wherein said bracket further includes a releasable locking mechanism on an upper portion thereof that is urged in a downward direction toward said triangular-shaped lower portion to release said first article from said bracket.

19. The method of claim 18 further comprising locking the first article with said bracket once said bracket has received the first article using an integrally formed latch and lock mechanism along an upper portion of said bracket, said mechanism having a saw tooth structure configured to engage a matching saw tooth structure in the first article, such that once said first article slides into engagement against said bracket, the engaged saw tooth structures of said bracket and said first article prevent the first article from being slidably movable relative to said bracket.

20. The method of claim 19 further comprising enabling a release of said first article from said bracket using a spring release mechanism of said latch and lock mechanism, said release mechanism having a handle, and imparting a pushing force on said handle to disengage said saw tooth structure of said bracket's latching mechanism from the saw tooth structure of the first article.

21. The method of claim 18 further comprising providing an overlapping interlock structure on said bracket configured to engage a matching overlapping interlock structure in the first article.

22. The method of claim 18 further comprising providing a bracket that is a male member having an overall shape configured to mate with a corresponding female member of said first article.

23. The method of claim 18 wherein said providing said bracket comprises providing a bracket wherein said level comprises a ball that moves freely along a curved track to identify level and that said ball moves to a center position when said bracket is level.

24. The method of claim 18 wherein said providing said bracket comprises providing a bracket wherein said level comprises a curved encased, liquid-filled tube having an air bubble that moves to a center window when said bracket is level.

25. The method of claim 18 wherein said attaching the first article with said bracket comprises sliding the first article down over said bracket after attaching said bracket to the second article and after leveling said bracket.

26. The method of claim 18 further comprising locking the first article with said bracket once said bracket has received the first article using a releasable locking mechanism, wherein said releasable locking mechanism is a ball plunger, a spring plunger, a slide latch or a releasable saw tooth mechanism.

* * * * *